United States Patent [19]

Snelling

[11] Patent Number: 4,804,980
[45] Date of Patent: Feb. 14, 1989

[54] LASER ADDRESSED IONOGRAPHY

[75] Inventor: Christopher Snelling, Penfield, N.Y.

[73] Assignee: Xerox Corporation, Stamford, Conn.

[21] Appl. No.: 191,510

[22] Filed: May 9, 1988

[51] Int. Cl.[4] .......................................... G01D 15/10
[52] U.S. Cl. .................................... 346/159; 346/160
[58] Field of Search ............ 346/160, 158, 159, 160.1, 346/107 R, 108, 155, 139 R; 355/5 C; 101/DIG. 13; 400/119; 358/300

[56] References Cited

U.S. PATENT DOCUMENTS

| | | | |
|---|---|---|---|
| 4,046,466 | 9/1977 | Ando et al. | 355/3 R |
| 4,105,444 | 8/1978 | Shinohara et al. | 355/35 C |
| 4,365,549 | 12/1982 | Fotland et al. | 101/1 |
| 4,430,661 | 2/1984 | Tarumi et al. | 346/153.1 |
| 4,494,129 | 1/1985 | Gretchev | 346/154 |

FOREIGN PATENT DOCUMENTS

| | | | |
|---|---|---|---|
| 125839 | 11/1978 | Japan | 355/35 C |
| 54-15747 | 2/1979 | Japan | 346/159 |
| 54-54637 | 5/1979 | Japan | 346/159 |

OTHER PUBLICATIONS

"Photo-Controlled Ion Flow Electrophotography", G. L. Pressman; Second International Conference on Electrophotography, Wash. D.C., Oct. 1973.

Primary Examiner—Arthur G. Evans
Attorney, Agent, or Firm—Frederick E. McMullen

[57] ABSTRACT

A high speed digital ionographic printer having a rotatable charge receptor, an ion source with ion discharge slot opposite the charge receptor, a cylindrical screen about the ion source composed of a conductive substrate with tiny holes and a photoconductive cover layer, parts of the screen riding against the charge receptor so that the screen rotates at the same velocity as the charge receptor, a screen charge corotron, and a laser writing beam which is scanned line by line across the moving screen to write latent eletrostatic images thereon which thereafter modulate the flow of ions through the slot in accordance with the latent electrostatic image written on the screen.

6 Claims, 2 Drawing Sheets

LASER ADDRESSED IONOGRAPHY

The invention relates to ionographic type printers, and more particularly, to improved high speed ionographic printers with synchronously moving ion aperture.

Electrographic transfer or ionographic printers of the type shown in U.S. Pat. No. 4,365,549 to Fotland et al employ a dielectric charge receptor which is typically a conductive drum having a dielectric covering or layer on which latent electrostatic images of the image being printed are created by means of an ion deposition process. Following this, the latent image is developed at a developing station and then transferred to and fixed on a copy sheet to provide the finished print.

To create the latent electrostatic image through ion deposition a source of ions, referred to generally as an ion generator, is provided. A control electrode, which is interposed between the ion source and the charge receptor, regulates the flow of ions to the charge receptor in response to an image signal input representative of the image to be printed.

However, processing speed in ionographic printers of the type discussed is limited by the ability of the ion deposition subsystem to deposit charges in sufficient magnitude onto the charge receptor for the specific development system of the printer. In current ionographic printers the size of the ion deposition aperture is fixed. Thus, the ion deposition time is limited by the relationship between the effective width of the ion deposition aperture and the system processing speed. Increasing the processing speed with fixed aperture systems therefore requires that ion current density be similarly increased.

In the ionographic arts, U.S. Pat. No. 4,046,466 to Ando discloses an electrographic system employing a light-lens exposure to expose a transfer screen. The Ando system, however, requires a special three-layer screen composed of a first or substrate layer, a second photoconductive layer, and a third insulator layer with attendant and relatively complex processing system in which the screen is first charged, then simultaneously imaged and discharged by a corotron, and then exposed to uniform light radiation in order to form the temporary latent electrostatic image used to modulate ion deposition onto the Ando charge receptor.

Other prior art patents in this field include U.S. Pat. No. 4,494,129 to Gretchev in which a print cartridge having offset ion deposition orifices is disclosed; U.S. Pat. No. 4,430,661 to Tarumui et al in which an ionographic apparatus having a ion current modulation electrode divided into plural blocks for parallel image signal input is disclosed; Japanese application No. 54-15747 to Andou in which a two speed ionographic system is disclosed that rotates the photosensitive screen at a first slower speed while the electrostatic image is formed thereon, and at a second higher speed while ion flow to the image receiving member is modulated; and Japanese Application No. 54-54637 to Yoshida where an ionographic apparatus is disclosed having a shield interposed between the image bearing screen and the image receiving member. And, "Photo-controlled Ion Flow Electrophotography" by G. L. Pressman (Second International Conference on Electrophotography, Washington D.C,. Oct. 24–27, 1973), discusses a method in which electrostatic fields are established in apertures that control the trajectory of charged particles to control the diameter of the ion stream.

In contrast to the prior art, the present invention provides a high speed digital ionographic printing apparatus with moving ion deposition aperture, simplified screen structure, and digital signal input, the printer having an imaging member with a conductive substrate and electrostatically chargeable outer layer on which latent electrostatic images of copies to be printed are created by ion deposition; a screen with a plurality of openings in preset spaced operating relation with the imaging member, the screen having a base of conductive material having a photoconductive exterior layer; means for charging the screen photoconductive layer to a uniform charge level; drive means for moving the imaging member and the screen in synchronism with one another; a stationary ion deposition chamber on the opposite side of the screen from the imaging member, the chamber having an elongated ion discharge slot through which ions pass from the chamber to the imaging member to create latent electrostatic images on the imaging member; a source of ions in the chamber; a high intensity image writing beam; means for modulating the writing beam in response to image signals representative of the images to be printed; and means for scanning the writing beam across the screen to expose the screen and provide a latent electrostatic image of the image represented by the image signals on the screen, subsequent movement of the screen past the slot modulating the flow of ions through the slot in accordance with the latent electrostatic image charge pattern on the screen to create a like latent electrostatic image on the imaging member.

IN THE DRAWINGS

Figure 1:
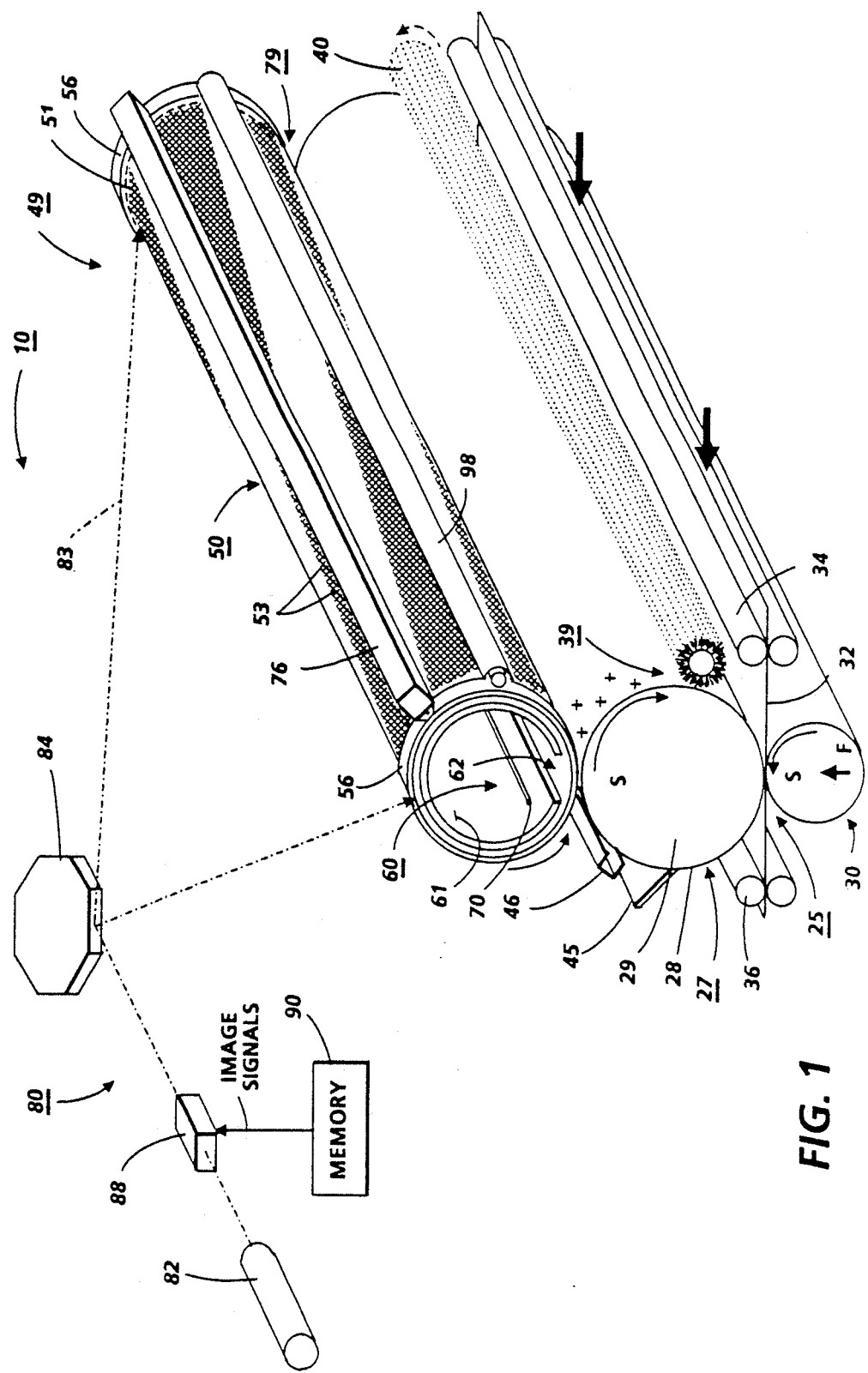
FIG. 1 is an isometric view depicting the high speed digital ionographic printer of the present invention with synchronously moving ion aperture in the form of a simple and inexpensive two layer ion deposition control screen and cooperating internal ion chamber and ion discharge slot.
Figure 2:
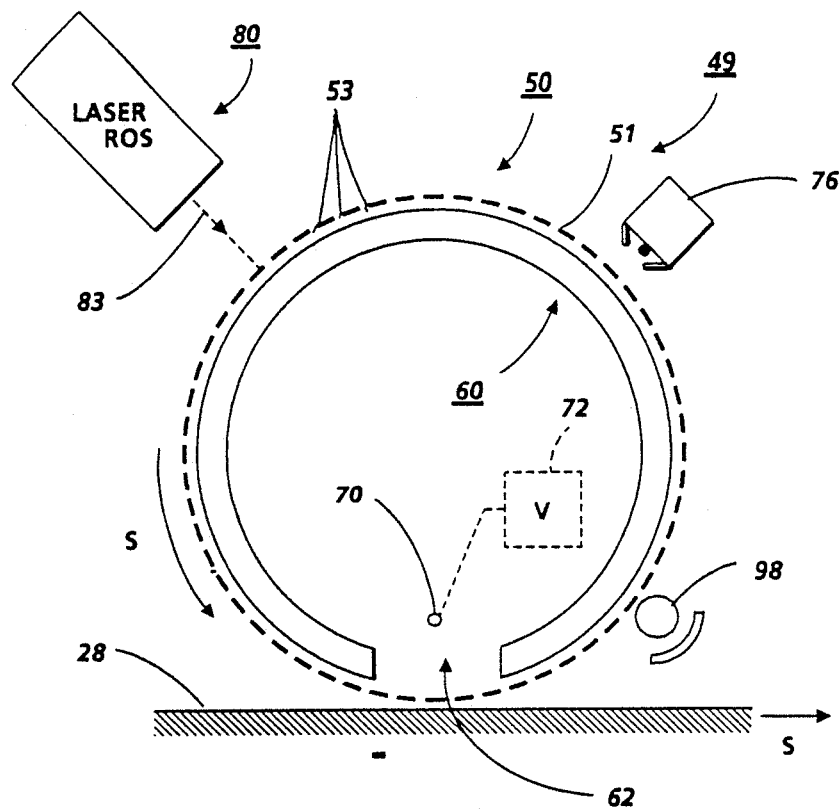
FIG. 2 is an enlarged cross sectional view showing details of the ion deposition control screen and ion chamber, and the operating relation between control screen, ion chamber, and the charge receptor of the printer shown in FIG. 1.
Figure 3:
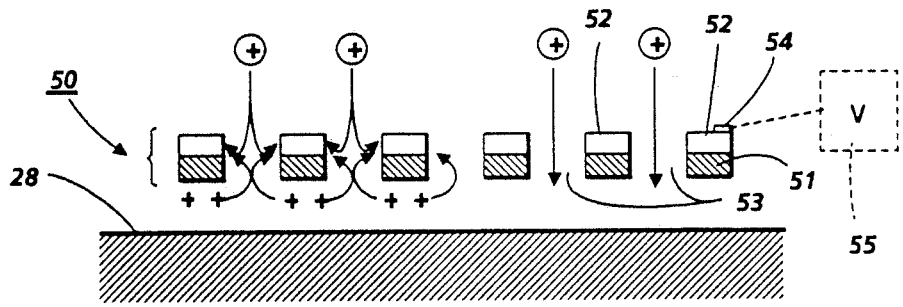
FIG. 3 is a view showing the controlled ion flow achieved by the present invention.

Referring to FIGS. 1–3 of the drawings, an ionographic type printer, designated generally by the numeral 10, of the present invention is there shown. Printer 10 has an imaging member composed of a dielectric charge receptor 27 in the form of a conductive drum or cylinder 29 having an electrostatically chargeable dielectric covering or dielectric layer 28. Charge receptor 27 is suitably supported for rotation in the direction shown by the solid line arrow in a suitable housing (not shown). A pressure cylinder or roller 30 is rotatably supported below charge receptor 27 and in operative relation thereto at transfer/fixing station 25, roller 30 cooperating with charge receptor 27 to define a nip through which copy sheets 32 pass.

Roll pair 34 on the upstream side of transfer/fixing station 25 and roll pair 36 on the downstream side of transfer/fixing station 25 are provided for bringing copy sheets 32 into and out of transfer relation with charge receptor 27 at transfer/fixing station 25. Copy sheets 32 are supplied from a suitable source such as a paper tray (not shown) having sheet feeder means and activated to advance the copy sheet(s) forward in timed registered relation with the images on charge receptor 27 to roll pair 34 for feeding to transfer/fixing station 25.

A magnetic developer roll 40 is provided at a developing station 39 for developing the latent electrostatic images formed on charge receptor 27 prior to transfer. Developer roll 40 is rotatably mounted within a developer housing (not shown) having a supply of toner for use in developing the electrostatic images on charge receptor 27 therein. Developer roll 40 rotates in a direction opposite to that of charge receptor 27 as shown by the dotted line arrow. Charge receptor 27, pressure roller 30, roll pairs 34, 36, and magnetic developer roll 40 are drivingly coupled to and rotated by a suitable motor (not shown).

To remove residual or leftover toner powder from the periphery of charge receptor 27, a scraper blade 45 is provided, blade 45 engaging against the surface of charge receptor 27 to wipe toner therefrom. A suitable erase apparatus 46 is provided downstream of blade 45 to discharge any leftover charges remaining on charge receptor 27.

While charge receptor 27 of printer 10 is shown and described in the form of a drum, other charge receptor types such as a belt may be envisioned.

The latent electrostatic images formed in the dielectric layer 28 of charge receptor 27 are thereafter developed by developer roll 40 to form a toner powder image on the charge receptor periphery. Thereafter, the toner powder image is simultaneously transferred and fixed to the copy sheet 32 at transfer/fixing station 25 through pressure engagement between cylinder 27 and roller 30. Any residual toner powder adhering to the charge receptor periphery is removed by scraper blade 45 and any residual electrostatic image charges on the charge receptor periphery are neutralized by erase apparatus 46.

Control of ion deposition to the electrostatically chargeable layer 28 of charge receptor 27 is effected by a combination external ion deposition control screen 50 and internal ion source 60 with ion discharge slot 62. Screen 50, which is in the form of a cylinder, is composed of a conductive substrate 52 having tiny openings or holes 53 therethrough, there being a photoconductive coating 51 on the exterior thereof. Substrate 52 of screen 50 is coupled through contact brush 54 with a suitable source of electrical bias 55. Screen 50 is arranged in predetermined spaced relation to the surface of charge receptor 27 and supported for rotation about an axis parallel to the axis of rotation of charge receptor 27 by suitable means (not shown). To drive screen 50 in synchronism with charge receptor 27 while achieving the predetermined spaced relation between screen 50 and the dielectric surface 28 of charge receptor 27 necessary for operation, end sections 56 of screen 50 have a slightly increased diameter. Screen end sections 56 rest or ride on the portions of charge receptor 27 opposite thereto to space the remainder of screen 50 from the dielectric surface 28 of charge receptor 27 and to rotate screen 50 in synchronism with charge receptor 27.

While a contact or friction drive system has been described to drive screen 50 in synchronism with charge receptor 27, screen 50 may instead be driven by other types of driving mechanisms, such as gears, belts, etc. In that event, screen 50 may not contact or touch charge receptor 27.

Ion source 60 comprises a cylindrical member 61 composed of a suitable dielectric material having an elongated ion disposition slot 62 of predetermined width therein. Slot 62, which is opposite to and faces the surface 28 of charge receptor 27, has a length equal to or slightly longer than the imaging width of charge receptor 27. Member 61 has a diameter slightly less than the internal diameter of screen 50 and is supported in predetermined fixed position within screen 50 by suitable support means (not shown) with the longitudinal axis of member 61 parallel to that of screen 50. A coronode wire 70 adapted to generate a predetermined quantity of ions along its length is disposed within member 61 in predetermined spaced relation to slot 62 in member 61. The ion emission length of coronode wire 70 is substantially equal to the length of slot 62, with the axis of wire 70 parallel to slot 62. Wire 70 is coupled to a suitable source of electrical potential 72. As will appear, screen 50 regulates and controls the flow of ions through the holes 53 which in turn controls the flow of ions through slot 62 to the surface 28 of charge receptor 27. A corotron 76 provides a uniform electrostatic charge to the photoconductive layer of screen 50 preparatory to exposure.

To provide high speed digital printing, a raster output scanner 80 is provided. Scanner 80 includes a source of high intensity light such as a laser 82. A rotating mirror in the form of polygon 84 is provided to scan or sweep the beam 83 output by laser 82 across the width of screen 50. A suitable modulator such as an acousto-optic (A/O) modulator 88 serves to modulate beam 83 in response to the image signal input derived, for example, from memory 90. Other sources of image signals as, for example, a document scanner, communication channel, etc. may be envisioned. Suitable optical means (not shown) focus beam 83 on polygon 84 and to a spot on screen 50 as will be understood. An erase lamp 98 erases leftover charges on screen 50 prior to changing thereof by corotron 76. It will be understood that where laser 82 comprises a laser diode, modulator 88 is dispensed with and the laser diode controlled directly by the image signal input.

OPERATION

During operation of printer 10, charge receptor 27, pressure roller 30, and developer roll 40 are driven in the direction shown. Copy sheet feed roll pairs 34, 36 are operated in synchronism therewith to bring copy sheets 32 forward to transfer/fixing station 25 in registered relation to the developed images formed on charge receptor 27. Screen 50 is rotated through engagement of end sections 56 with the dielectric surface 28 of charge receptor 27 at the same velocity as charge receptor 27. The photoconductive coating 51 on screen 50 is uniformly charged by corotron 76 and exposed line by line by imaging beam 83 as beam 83 is swept across the width of screen 50 by polygon 84, beam 83 being modulated by modulator 88 in response to the image signal input from memory 90. Substrate 52 of screen 50 is biased to a preset bias by potential source 55. Ion generating wire 70, which is energized by potential source 72, emits ions along the length of the wire to the interior of member 61 and through slot 62 to the portion of the dielectric surface 28 of charge receptor 27 currently opposite thereto. In the example shown and discussed, the photoconductive coating 51 of screen 50 has a predetermined positive charge placed thereon by corotron 76 while substrate 52 thereof is set to a preset positive bias. The ions generated by wire 70 are positive.

Exposure of the previously charged photoconductive surface 51 of screen 50 by imaging beam 83 creates or writes, line by line, a latent electrostatic image on the surface 51 of screen 50. Rotation of screen 50 carries the electrostatic image charge pattern created thereon past slot 62 in member 61. There, the image charge pattern on surface 51 of screen 50 limits and controls the flow of ions through holes 53 in screen 50 which in turn controls the flow of ions through the ion deposition slot 62 to the dielectric surface 28 of charge receptor 27 therebelow. Where for example, the original charge placed on the photoconductive surface 51 of screen 50 by corotron 76 remains substantially intact, as in the case where imaging beam 83 is modulated to the 'off' condition, the fringe fields created by the relatively high charge on screen 50 repels the like-charged ions, thereby preventing or at least substantially inhibiting the flow of ions through holes 53 in screen 50 and therefore the discharge of ions through slot 62 to charge receptor 27.

On the other hand, where the original charge placed on the screen 50 by corotron 76 is reduced or dissipated as a result of exposure by imaging beam 83, the flow of ions through holes 53 in screen 50 is less restricted, allowing the ions to pass substantially unimpeded through slot 62 and be deposited on the dielectric surface 28 of charge receptor 27.

As a result, latent electrostatic latent images corresponding to the image content of the image signal input from memory 90 are created on charge receptor 27. The latent electrostatic images are thereafter developed by developer roll 40 and transferred to a copy sheet 32 brought forward in timed relation thereto at transfer/fixing station 25 to provide finished prints.

It will be understood that the screen 50 functions both to modulate the flow of ions through the holes 53 in screen 50 and to buffer the modulated information through the entire ion deposition time period. In the case of the former, the flow of ions is modulated according to the magnitude of fringe fields from the charge pattern retained on the photoconductive layer 51 of screen 50. Buffering enables simultaneous ion deposition to occur over the entire ion deposition zone, with retention of the input information pattern produced through exposure by imaging beam 83 until transfer to charge receptor 27.

While positive (+) ion deposition has been shown and described, negative (−) ion deposition may instead be used. Further, screen 50, which is shown and described in the form of a cylinder, may instead be in the form of a belt. And, ion source 60 is not limited to the cylindrical configuration shown but instead may take any suitable shape.

The present invention allows a substantial increase in the operating speed of ionographic printers of the type described herein. Additionally, the ion flow modulation achieved by fringe fields normal to the surface of charge receptor 27 permits ion deposition size to be controlled which in turn allows image density or gray scale control. The ability to control spot size and produce small spots is thought to be due, at least in part, to the reduction in ion beam spreading due to the space charge created as a result of the low ion current densities required. As a result, the proposed printer has the advantage of eliminating the need to pre-charge the charge receptor to achieve the high projection fields employed.

A second important advantage achieved by the invention relates to the asymmetry achieved in the surface potential of the exposed photoconductive layer surrounding the apertures which can desirably skew spots away from the geometric centers of the screen holes. This is believed to contribute to a surprising ability that has been found to produce diagonal lines with little if any apparent staircase artifacts.

In essence, the combination of spot size and spot placement control achieved by the present invention combine to increase the number of addressable spots to greater than the number of screen apertures per unit area. As a result, fairly coarse and therefore robust photoconductive screen structures can achieve high copy quality levels in the present invention.

While the invention has been described with reference to the structure disclosed, it is not confined to the details set forth, but is intended to cover such modifications or changes as may come within the scope of the following claims.

I claims:

1. In a digital ionographic printing apparatus having an imaging member with a conductive substrate and electrostatically chargeable outer layer on which latent electrostatic images of copies to be printed are created by ion deposition; a screen with a plurality of openings in preset spaced operating relation with said imaging member, said screen including a base of conductive material having a photoconductive exterior layer thereon; means for charging said screen photoconductive layer to a uniform charge level; drive means for moving said imaging member and said screen in synchronism with one another; and a stationary ion source on the opposite side of said screen from said imaging member, said ion source having an elongated ion discharge slot through which ions pass from said ion source to said imaging member to create latent electrostatic images on said imaging member; the combination of:

(a) a high intensity image writing beam;
(b) means for modulating said writing beam in response to image signals representative of the images to be printed; and
(c) means for scanning said writing beam across said screen to expose said screen and provide a latent electrostatic image of the image represented by said image signals on said screen, subsequent movement of said screen past said slot modulating the flow of ions through said slot in accordance with the latent electrostatic image on said screen to create a like latent electrostatic image on said imaging member.

2. A high speed, high resolution ionographic printer having a recording member, an ion generator in spaced relation to said recording member, a stationary cylinder substantially surrounding said ion generator having an aperture through which ions produced by said ion generator impinge on said recording member, a rotatable photoconductive screen with holes therein encircling said cylinder; drive means to rotate said screen so that said screen surface velocity is synchronous with the velocity of said recording member; a corotron for charging said screen, and a laser beam modulated in accordance with an image signal input to imagewise expose said screen and provide an image charge pattern on said screen, said screen in turn controlling the flow of ions from said ion generator through said aperture in accordance with the image charge pattern on said screen passing opposite said aperture.

3. In a digital ionographic printing apparatus, the combination of:
  (a) a movable charge receptor having a conductive core and an electrostatically chargeable surface layer;
  (b) a stationary member forming an ion chamber disposed in preset spaced relation with said charge receptor, the axis of said member being parallel to the axis of said charge receptor;
  (c) said member having a slot facing said charge receptor and providing an ion deposition zone, the axis of said slot being parallel to the axis of said charge receptor;
  (d) ion generating means in said member, said ion generating means being in predetermined spaced operating relation with said slot to enable a discharge of ions through said slot to the portion of said charge receptor opposite thereto;
  (e) a screen interposed between said member and said charge receptor,
  said screen being composed of conductive base with photoconductive layer on the exterior thereof;
  (f) means supporting said screen for movement;
  (g) drive means for moving said screen in synchronism with said charge receptor;
  (h) means for charging said screen photoconductive layer; and
  (i) means for scanning an imaging beam across said screen at a point upstream of said slot to thereby expose said screen and create a latent electrostatic image thereon, movement of said screen bringing the latent electrostatic image on said screen past said slot whereby to modulate the flow of ions from said ion generating means through said slot to said charge receptor and reproduce said latent electrostatic image on said charge receptor.

4. The apparatus according to claim 3 in which drive means comprises means drivingly coupling said screen with said charge receptor.

5. The apparatus according to claim 3 including means to bias said screen substrate to a predetermined potential.

6. In a digital ionographic printing apparatus, the combination of:
  (a) a rotatable cylindrical imaging member having a conductive core and an electrostatically chargeable surface layer;
  (b) a stationary cylinder disposed in preset spaced relation with said imaging member, the axis of said stationary cylinder being parallel to the axis of said imaging member;
  (c) said stationary cylinder having a slot facing said imaging member and providing an ion deposition zone, the axis of said slot being parallel to the axis of said imaging member;
  (d) ion generating means in said stationary cylinder, said ion generating means being in predetermined spaced operating relation with said slot to enable a discharge of ions through said slot to the portion of said imaging member opposite thereto;
  (e) a movable cylinder-like screen surrounding said stationary cylinder, the inner dimension of said screen being greater than the outer dimension of said stationary cylinder,
  said screen being composed of conductive base with photoconductive layer on the exterior thereof;
  (f) means supporting said screen in driving engagement with said charge receptor whereby said screen is rotated about said stationary cylinder in synchronism with said imaging member;
  (g) means for charging said screen photoconductive layer; and
  (h) means for scanning an imaging beam across said screen at a point upstream of said slot to thereby expose said screen and create a latent electrostatic image thereon, rotation of said screen bringing the latent electrostatic image on said screen past said slot whereby to modulate the flow of ions from said ion generating means through said slot to said imaging member and reproduce said latent electrostatic image on said imaging member.

* * * * *